July 4, 1967
R. FELDMAN
3,329,022
TEMPERATURE MEASUREMENT BY SUBLIMATION OF LAYERS OF RADIOACTIVE MATERIAL
Filed Nov. 4, 1963
3 Sheets-Sheet 1
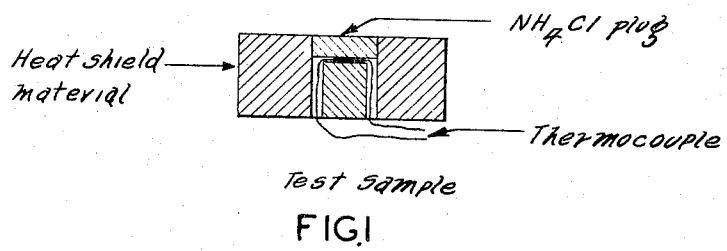
FIG.1
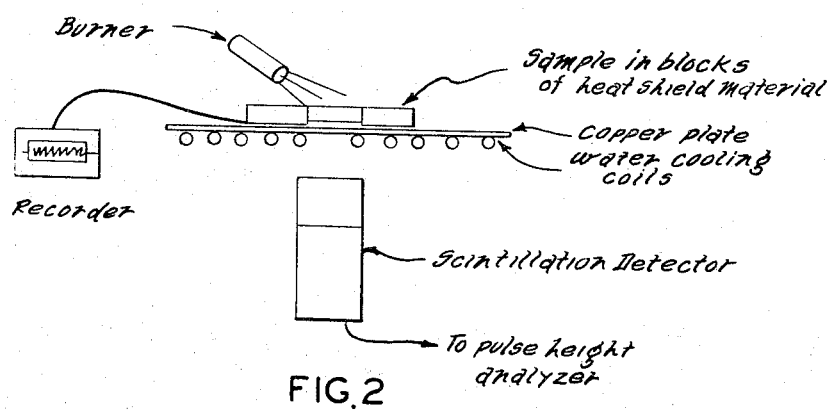
FIG.2
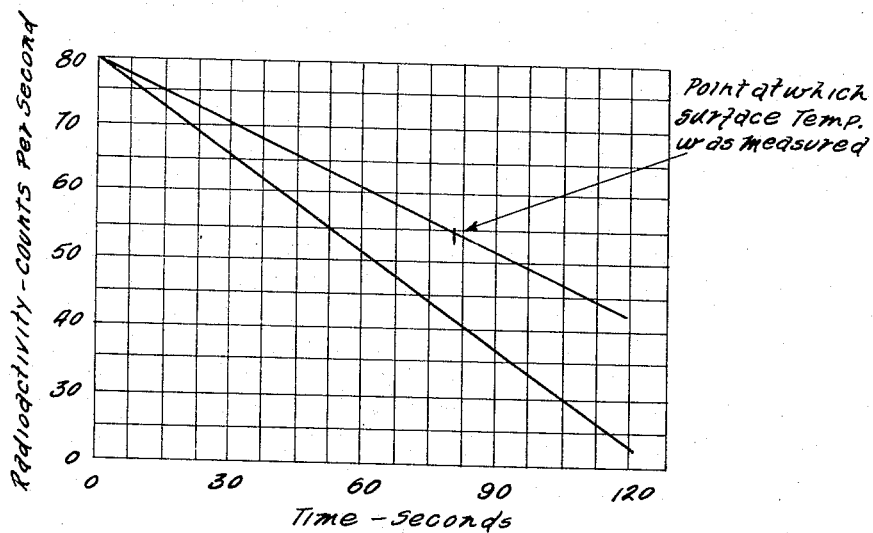
FIG.5
INVENTOR.
RUBIN FELDMAN
BY 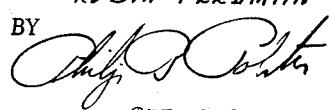
ATTORNEY,

INVENTOR.
RUBIN FELDMAN
BY
ATTORNEY.

United States Patent Office 3,329,022
Patented July 4, 1967

3,329,022
TEMPERATURE MEASUREMENT BY SUBLIMATION OF LAYERS OF RADIOACTIVE MATERIAL
Rubin Feldman, Creve Coeur, Mo., assignor to Emerson Electric Co., a corporation of Missouri
Filed Nov. 4, 1963, Ser. No. 321,310
22 Claims. (Cl. 73—358)

This invention relates to the measurement of temperatures, both as to degree and duration.

At extremely high temperatures and under certain conditions, such as those which would be experienced in the measurement of surface temperatures of hyper-velocity vehicles, the usual temperature measuring techniques in which a record is made of the degree and duration of temperature, utilizing thermocouples, pyrometers and the like, have not been satisfactory.

One of the objects of this invention is to provide a method by which both the degree and duration of temperatures can be measured and recorded, using available components, and circuitry which requires little space.

Another object is to provide such a method by which the temperatures of normally inaccessible surfaces can be measured.

This application is a companion to my application Ser. No. 311,816, now abandoned filed Sept. 26, 1963.

In accordance with this invention, generally stated, a method of measuring temperatures is provided, in which the rate and extent of ablation of compositions which change state and are physically removed from the area of consideration, at a known temperature, is measured and compared against a standard. These compositions are solids and may be sublimates or they may decompose, boil off or otherwise be converted to a form in which they are removed, but the change of state to the appropriate form must take place at a definite, predeterminable temperature at a given pressure. In the present state of development, endothermic changes are preferred, the required amount of heat being small relative to the total heat flux from the heat source. These compositions are referred to hereinafter as temperature-critical ablates. A convenient way of measuring the ablation rate and amount is described in detail in the companion application. This consists of measuring radioactivity from sources contained within the temperature-critical ablates themselves.

In the simplest version of the method of this invention, a single subliming salt, reinforced, if necessary, with a non-subliming material is formed into a "plug," either cast or applied as a coating to a supporting surface, in a layer of uniform density and thickness. The sublimating composition of the plug may be rendered radioactive before it is applied or cast, by the incorporation of a radioactive isotope as one of the elements of the subliming material or by activating the subliming salt, or after it is applied or cast, by exposing the applied or cast composition to neutron bombardment.

A suitable radiation sensor is then positioned on the side of the plug away from the expected source of heat, to count the radiations emanating from the sublimating material. The radiation sensor can be of any suitable type. Under present conditions, the scintillation counter serves well, where the particular application permits the use of the relatively bulky and fragile photo multiplier required by the scintillation counter. Solid state charged particle detectors are also satisfactory.

The surface of the layer of subliming material opposite the surface adjacent which the radiation sensor is positioned is then exposed to a temperature which must necessarily be greater than the subliming temperature of the sublimating material.

The rate at which the sublimate is ablated will be a function of the degree of temperature at a given heat flux. The amount of sublimate which is consumed is a function of the duration of the temperature at the given heat flux. Accordingly, since the radiation sensor is producing a continuous record of the density of the sublimating material on a time scale, the degree and duration of temperature through any small increment of time can readily be determined.

Various other types of temperature-critical ablates may, of course, be used in lieu of the sublimating compositions.

A more refined and preferred embodiment of the method of this invention involves the use of a plurality of sublimating compositions of different temperatures of sublimation and which, when rendered radioactive, produce radiation of distinctly different energy levels. The various sublimates are energized and the radiation from them sorted, by energy level, by conventional discriminating devices. By suitable selection of temperatures of sublimation, the temperature to which the sublimates are subjected can be bracketed, somewhat in the manner of use of pyrometric cones. That is to say, as the temperature of the plug rises, the characteristic subliming temperature of each compound is reached in turn, and is signaled by a decrease in the counting rate of that compound as it sublimes. While other temperature-critical ablates can be used in this embodiment, care must be taken to ensure that products of decomposition do not react with other ablates or that ablates which boil off do not form a molten matrix entrapping other ablates, or that some other undesirable interaction does not occur. To this end, a layered structure, graduated from ablates of the highest critical temperature at the layer farthest from the heat source to ablates with the lowest critical temperature at the initially exposed surface, can be used. A heat stable compound, or one that sublimes or decomposes at a temperature much in excess of the upper limit of the range of interest may be used to indicate recession of the plug by attrition, its rate and amount, in the manner described in my copending application, and thereafter can then be taken into account in the measurement of counting rate decreases of the ablating compounds within the range of interest. The natural decay of the radioisotopes can also easily be calculated and correction made for it.

In use in the measurement of surface temperatures of heat shields for space vehicles, the detector will be placed inside the vehicle, together with the analysis and telemetry equipment. For this reason, radioisotopes which emit gamma rays will be used, since only those rays are capable of penetrating the heat shield and structural materials.

The method of this invention is applicable to a great range of temperatures. Merely by way of example, it is likely that in heat shield application, it will be desirable to determine surface temperatures on the order of three thousand to forty-five hundred degrees Fahrenheit. Suitable compounds for this range include:

| Compound: | Approximate temperature at phase change, ° F. |
|---|---|
| Ziconium | 3000 |
| Hafnium | 3200 |
| Zinc oxide | 3270 |
| Barium oxide | 3530 |
| Barium fluoride | 3850 |
| Niobium | 4040 |
| Tantalum | 4040 |
| Europium fluoride | 4100 |
| Zirconium oxide | 4300 |
| Zircon | 4530 |
| Thorium oxide | 4400 |

More refractory ablates can be used to obtain measurements of even higher temperatures. On the other hand, experiments have been made with ammonium chloride (NH₄Cl), which sublimes at a temperature of 335° C., and other materials which sublime at even lower temperatures, which indicate the validity of the method as applied throughout a wide range.

As an example, three tests were made using activated ammonium chloride as the temperature-critical ablate. The results of these tests were entirely consistent with what had been calculated. That is to say, the temperature at which the activated ammonium chloride sublimed was and remained the temperature of sublimation of ammonium chloride previously determined by thermogravimetric analysis, by differential thermal analysis (see FIGURE 3), and by calculations from vapor pressure data. This confirmed that in use, when the counting rate of the selected radiation from the plug begins to decrease in response to the ablation of the plug, the surface temperature will just have reached the ablation temperature of the temperature-critical ablate the radiation from which is being measured. In the tests, this was 335° C., the temperature of sublimation of ammonium chloride.

The test equipment and graphs showing various measurements and results are illustrated in the drawings, in which—

FIGURE 1 is a diagonal cross-sectional view of a test sample;

FIGURE 2 is a schematic view of test equipment, various elements of which are shown, for clarity, disproportionately;

Figure 3:
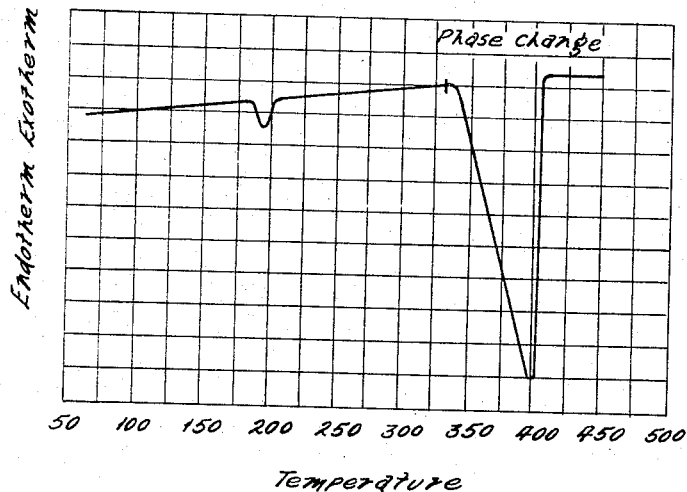
FIGURE 3 is a graph showing a differential thermal analysis of ammonium chloride.
Figure 4:
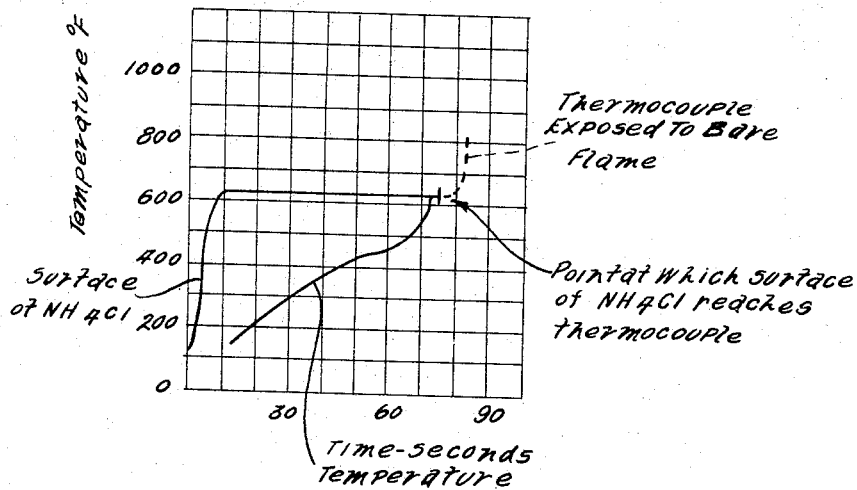
Figure 6:
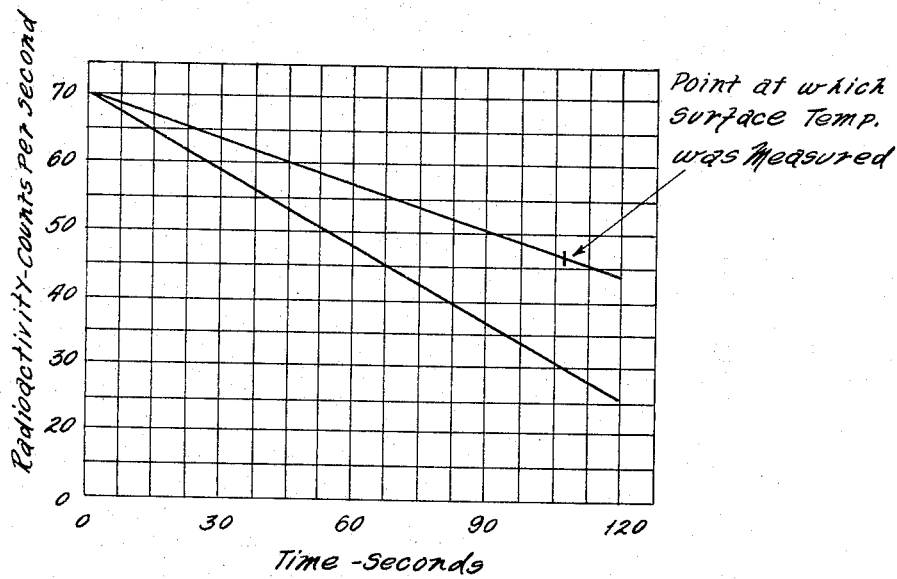
Figure 7:
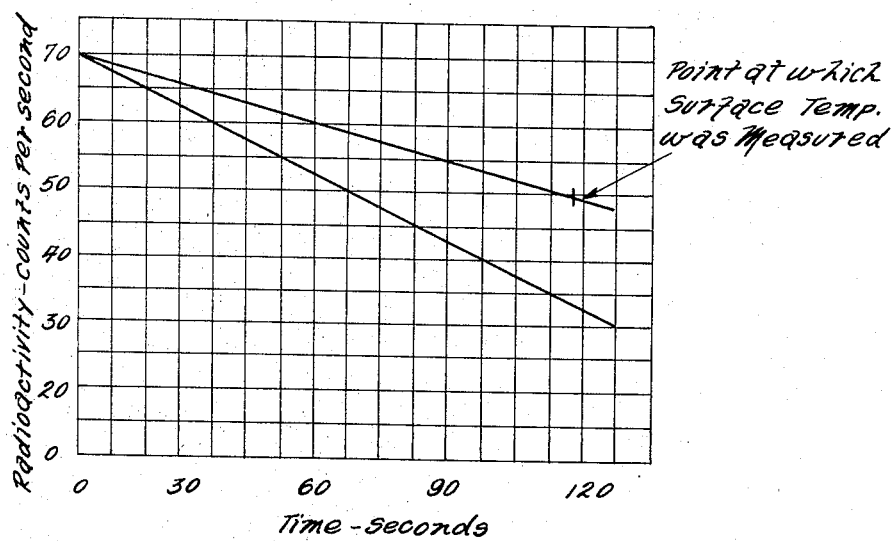

FIGURE 4 is a graph showing a typical temperature trace of a thermocouple buried in the ammonium chloride as the superincumbent ammonium chloride sublimes to expose the thermocouple until the flame which is the heat source impinges directly upon the thermocouple; and FIGURES 5, 6 and 7 are graphs illustrating the results of tests, the upper line in each graph representing a count rate corrected for normal decay and the lower line the actual measured count rate.

Tubular samples of heat shield material ("Thermolag"), one inch in diameter and 7/16″ thick, each containing a 3/8″ plug of pressed ammonium chloride in its hollow center, were prepared. A chromel alumel thermocouple was buried in the pressed ammonium chloride 1/16″ from its upper surface. The sample is illustrated in FIGURE 1.

The samples were activated in a neutron generator to produce radioactive isotopes. While the irradiation produced several isotopes in the heat shield material, the chlorine isotope in the ammonium chloride produces a unique 3.2 mev. peak which is easily discriminated. The radiation from the reaction

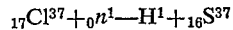

$$_{17}Cl^{37} + _0n^1 \rightarrow H^1 + _{16}S^{37}$$

the one thought to be involved, has a half life of 5.04 minutes, so that the test was made immediately following the activation, and correction was made for the decay. Thus, in FIGURES 5, 6 and 7, the upper curve is corrected for normal decay; the lower curve represents the actual measured count rate.

In each case, as illustrated diagrammatically in FIGURE 2, a sample was placed on a water cooled copper plate above a scintillation detector connected to a pulse height analyzer, the thermocouple leads were connected to a recorder, and flame from a burner was directed onto the upper surface of the sample. The discriminator to which the scintillation counter was connected was set to read only the gamma rays under the 3.2 mev. peak. The instrument was programmed to read these gamma rays for successive intervals of 2.4 seconds, that is, the count was made for 2.4 seconds, the result stored in the analyzer memory and for a second count taken for the next 2.4 second interval.

Three minutes after the end of the activation, the burner, counter and thermocouple recorder were started simultaneously, and data was accumulated until the ammonium chloride had sublimed down to the thermocouple and somewhat beyond.

The results of three such tests are shown in FIGURES 5, 6 and 7. The point at which the bare thermocouple was first exposed to the flame, i.e., at which the superincumbent ammonium chloride had sublimed, and at which a measurement of surface temperature was made from the thermocouple, is indicated. In each case the recorded temperature was the sublimation temperature of the ammonium chloride, i.e., approximately 636° F. (335° C.).

Since the burner setting and its distance from the sample remained the same throughout each test, the heat flux to the surface of the sample also remained constant. Therefore the temperature of the surface also must have been invariant after sublimation began.

The rate of sublimation depended upon the heat flux which in this case was a function of the distance of the burner from the sample. This distance was constant during each test, but varied from test to test. This rate can be measured from the slope of the "corrected activity" curve and as is shown in the following table:

TABLE 1

| Experiment No. | Slope | Mass Loss Rate, Percent/sec. |
|---|---|---|
| 1 | .31 | 0.39 |
| 2 | .22 | 0.31 |
| 3 | .18 | 0.26 |

It will also be observed that in spite of the difference in the rate of mass loss, the same temperature was found in each test. This confirms that all decrease of activity takes place at a fixed temperature of sublimation regardless of the heating rate, though the rate of decrease varies with the heating rate. Thus, if the amounts and ranges of sublimation temperature of the sublimating compounds are properly chosen, the limits of temperatures and an excellent approximation of the rate of heating within these limits can be obtained; or, if the temperature is constant and within the limits, the absolute temperature can be closely approximated using the rate of sublimation.

In using a plurality of temperature-critical ablates of different ablation temperatures and counting rates or energy levels, one can form successive horiozntal layers graduated, from top to bottom, by successively higher temperatures of ablation, as has been suggested heretofore, or successive vertical layers so graduated from side to side, or, with the precautions suggested, one can mix the different compounds homogeneously. In any case, normally the amount of each activated temperature-critical ablate employed is very small, so that the problem of maintaining separation of layers or of particles in a matrix, is not a difficult one, nor is the endo- or exo-thermic character of the change of state, within limits evident to anyone skilled in the art.

It has been noted that the temperature at which the change of state of the temperature-critical ablates takes place must be accurately known at a given pressure. Depending upon the nature of the change of state and the characteristics of the ablate, pressure may be a large or small factor. However, for sublimates, for example, vapor pressure curves are either well known or easily established and the ambient pressure at the time of ablation can easily be determined, so that proper correction can be made for pressures different from a standard atmospheric pressure. The fact that the temperature of sublimation varies with variation in pressure can be utilized to measure pressure, or to detect when a predetermined transient (lower) pressure has been reached. Thus, if the temperature of a sublimate is fixed, either continuously or instantaneously, the pressure at the moment of sublimation, for a minute amount of the sublimate, can be established, in the same way as the temperature is established at a known pressure.

It has been noted that the natural decay rate of the radioisotopes or the ablates must be taken into account in determining that ablation is taking place and its true rate. The half life of the activated ammonium chloride of the examples was about five minutes, so that considerable correction had to be made. However, in practice, radioisotopes having half lives of hours, days or weeks, depending upon the requirements of use, will be utilized, suitable radioisotopes being well known to those skilled in the art.

Numerous variations in the practice of this invention, within the scope of the appended claims, will occur to those skilled in the art in the light of the foregoing disclosure. Almost innumerable temperature-critical ablates can be used. Merely by way of example, the sublimating compositions described in Feldman U.S. Patent No. 3,022,190 are all suitable and the characteristics of other temperature-critical ablates are set out in many standard chemical texts and handbooks. By way of example of variations in the use, temperature measurements at various depths of a thick heat shield can be measured by incorporating plugs, spaced laterally from one another, at various depths in the heat shield. For this purpose, relatively thin, disks, with minute amounts of radioactive ablate are preferred.

Having thus described the invention, what is claimed and desired to be secured by Letters Patent is:

1. A method of measuring surface temperature of a heat shield comprising forming a plug containing a plurality of temperature-critical ablates, said ablates being radioactive and having distinctly different energy levels, incorporating said plug in a heat shield, exposing said plug and heat shield to an unknown temperature above the temperature of ablation of the ablate having the lowest temperature of ablation, and measuring the counting rate of radiation from the various ablates over known increments of time during a period in which the said plug is exposed to said temperature, a decrease in the corrected counting rate for a particular ablate signalling the reaching of its temperature of ablation by a portion of said plug.

2. The method of claim 1 wherein the temperature-critical ablate is a sublimating composition.

3. A method of measuring temperature comprising incorporating into a shape a temperature-critical ablate having a known rate of ablation within a given range of temperatures, said ablate being radioactive, measuring the counting rate of radiation from said ablate, exposing said ablate to an unknown temperature above its temperature of ablation, measuring the counting rate of radiation over known increments of time during a period in which the said ablate is exposed to said temperature, and correlating the counting rate of said radiation with a standard to determine said temperature.

4. The method of claim 3, with the step of making the ablate with a radioactive isotope.

5. The method of claim 3, with the step of activating the ablate after it is formed, by bombarding it with neutrons.

6. A method of measuring temperature comprising forming a plug containing a plurality of temperature-critical ablates which have different temperatures of ablation and distinctly different levels of gamma ray emission when irradiated, subsequently irradiating said ablates; exposing said plug to a temperature at least as high as the ablating temperature of one of said ablates; detecting the radiation from said ablates; discriminating said radiation to distinguish said different ablates; measuring the counting rate of radiation from each of said ablates at known increments of time through a period in which said plug is exposed to said temperature, and correlating said counting rate with a standard to establish the temperature of the hottest portion of said plug as a function of time.

7. A method of measuring temperature comprising forming a plurality of layers of different materials each of which layers ablates at a different temperature, activating each of said layers to a distinctly different energy level, exposing said layers to a temperature at least as high as the ablating temperature of one of said layers, detecting the radiations from said layers, discriminating said radiation by energy level, measuring the counting rate of radiation from each of said layers at known increments of time through a period in which the layers are exposed to said temperature, and correlating the said counting rate with a standard to establish the temperature of the hottest portion of said plug as a function of time.

8. The method of claim 7 wherein the layers are horizontal and graduated from top to bottom by successively higher temperatures of ablation of the ablating compound of said layer.

9. The method of claim 7 wherein the layers are vertical, so that an edge of each layer is exposed at the surface.

10. A method of measuring temperature comprising forming a plug containing a plurality of sublimating compounds which have different temperatures of sublimation and distinctly different levels of radiation when irradiated, said compounds being irradiated, exposing said plug to a temperature at least as high as the sublimating temperature of one of said compounds, detecting the radiation from said compounds, discriminating said radiation to distinguish said different compounds, measuring the counting rate of radiation from each of said compounds at known increments of time through the period in which said plug is exposed to said temperature, and correlating said counting rates with a standard.

11. The method of claim 10 wherein the compounds are uniformly distributed through said plug.

12. A method of measuring temperature comprising incorporating into a shape a sublimate having a known rate of sublimation within a given range of temperatures, said sublimate being radioactive, measuring the counting rate of radiation from said sublimate, exposing said sublimate to an unknown temperature above its temperature of sublimation, measuring the counting rate of radiation over known increments of time during a period in which the said sublimate is exposed to said temperature, and correlating the counting rate of said radiation with a standard to determine said temperature.

13. The method of claim 12, with the step of making the sublimate with a radioactive isotope.

14. The method of claim 12, with the step of activating the sublimate after it is formed, by bombarding it with neutrons.

15. A method of measuring surface temperature comprising incorporating into a discrete portion of a surface, the temperature of which under conditions of subsequent heating is to be measured, a temperature critical sublimating composition having a known rate of sublimation within a given range of temperatures at a given heat flux, exposing said surface to an unknown temperature, at a known heat flux, above the critical temperature of sublimation of said sublimating composition, measuring the rate of sublimation of said sublimation composition over known increments of time, and correlating said rate of sublimation with a standard to determine the surface temperature of the contiguous usrface.

16. A method of measuring surface temperature comprising incorporating into a discrete portion of a surface, the temperature of which under conditions of subsequent heating is to be measured, a temperature critical radioactive ablate having a known rate of ablation within a given range of temperature at a given heat flux, exposing said surface to an unknown temperature, at a known heat flux, above the critical temperature of ablation of said ablate, measuring the rate of ablation of said ablate over known increments of time by measuring the decrease of counting rate of radioactivity with time, and correlating said counting rate with a standard o deermine the surface temperature of the contiguous surface.

17. The method of claim 16 with the step of making the ablate with a radioactive isotope.

18. The method of claim 16 with the step of activating the ablate after it is formed by bombarding it with neutrons.

19. A method of measuring transient temperature comprising incorporating into a discrete portion of a surface the temperature of which under conditions of subsequent heating is to be measured a sublimating composition, an element of which is radioactive, said composition having a discretely defined transition point at a known temperature and pressure, the transition of said sublimate from solid to gas being signalled by a change in counting rate of the radioactive element, said composition being incorporated in minute quantities as compared with the mass of the matrix in which the composition is incorporated, exposing said surface to an unknown temperature at a known pressure above the said transition temperature of said sublimating composition, and recording the transition of said composition.

20. A method of measuring temperature of a thick heat shield, at various depths, comprising forming a plurality of plugs containing a radioactive temperature-critical ablate, introducing said plugs in laterally spaced relationship at a plurality of depths in said heat shield, detecting radiation from said plugs, discriminating the radiation of individual of said plugs, exposing said heat shield to an unknown temperature above the critical temperature of said ablate, and recording the ablation of the ablate in each plug in terms of the resultant decrease in radiation, as it occurs.

21. A method of measuring temperature of a heat shield comprising forming a plug containing a plurality of radioactive materials, at least one of which is refractory with respect to the temperature to which it is to be subjected and at least one of which is ablative with respect to the temperature to which it is to be subjected; incorporating said plug into said heat shield; exposing said heat shield and plug to an unknown temperature above the ablating temperature of the ablative material and subjecting said heat shield and plug to attrition; measuring the counting rate of the refractory and ablative materials and discriminating said ablative refractory material counting rates, while said plug is exposed to said temperature and attrition and correlating the decrease of counting rate of the ablative material attributable to its ablation with the decrease of counting rate attributable to the refractory material.

22. The method of measuring pressure comprising fixing the temperature of a radioactive sublimate, the sublimating temperature of which varies in a known predetermined way with pressure; measuring the radiation level of the radioactive sublimate; thereafter subjecting the sublimate, at said fixed temperature, to variations in pressure, and recording a drop in radiation level signalling the sublimation of said sublimate.

References Cited
UNITED STATES PATENTS

| | | | |
|---|---|---|---|
| 1,676,536 | 7/1928 | Ferkel. | |
| 2,938,384 | 5/1960 | Soreng et al. | 73—358 |
| 3,015,950 | 1/1962 | Doctor et al. | 73—86 |

DAVID SCHONBERG, *Primary Examiner.*

LOUIS R. PRINCE, S. H. BAZERMAN, F. SHOON, *Assistant Examiners.*